United States Patent
Zeffer et al.

(10) Patent No.: US 7,509,460 B2
(45) Date of Patent: Mar. 24, 2009

(54) DRAM REMOTE ACCESS CACHE IN LOCAL MEMORY IN A DISTRIBUTED SHARED MEMORY SYSTEM

(75) Inventors: Håkan E. Zeffer, Uppsala (SE); Anders Landin, San Carlos, CA (US); Erik E. Hagersten, Uppsala (SE)

(73) Assignee: Sun Microsystems, Inc., Santa Clara, CA (US)

( * ) Notice: Subject to any disclaimer, the term of this patent is extended or adjusted under 35 U.S.C. 154(b) by 532 days.

(21) Appl. No.: 11/417,640

(22) Filed: May 4, 2006

(65) Prior Publication Data

US 2007/0260821 A1 Nov. 8, 2007

(51) Int. Cl.
*G06F 12/00* (2006.01)
*G06F 13/00* (2006.01)

(52) U.S. Cl. .................. 711/143; 711/100; 711/118; 711/154

(58) Field of Classification Search .......... 711/100, 711/117, 118, 143, 154
See application file for complete search history.

(56) References Cited

U.S. PATENT DOCUMENTS

| 4,858,111 | A | * | 8/1989 | Steps | 711/143 |
|---|---|---|---|---|---|
| 5,034,885 | A | * | 7/1991 | Matoba et al. | 711/143 |
| 5,276,851 | A | * | 1/1994 | Thacker et al. | 711/120 |
| 5,335,335 | A | * | 8/1994 | Jackson et al. | 711/121 |
| 5,893,144 | A | | 4/1999 | Wood et al. | |
| 5,950,225 | A | | 9/1999 | Kleiman | |
| 6,094,707 | A | * | 7/2000 | Sokolov et al. | 711/113 |
| 6,119,205 | A | * | 9/2000 | Wicki et al. | 711/143 |
| 6,502,168 | B1 | * | 12/2002 | Arimilli et al. | 711/119 |

* cited by examiner

*Primary Examiner*—Tuan V. Thai
(74) *Attorney, Agent, or Firm*—Lawrence J. Merkel; Meyertons, Hood, Kivlin, Kowert & Goetzel, P.C.

(57) ABSTRACT

In one embodiment, a memory controller for a node in a multi-node computer system comprises logic and a control unit. The logic is configured to determine if an address corresponding to a request received by the memory controller on an intranode interconnect is a remote address or a local address. A first portion of the memory in the node is allocated to store copies of remote data and a remaining portion stores local data. The control unit is configured to write writeback data to a location in the first portion. The writeback data corresponds to a writeback request from the intranode interconnect that has an associated remote address detected by the logic. The control unit is configured to determine the location responsive to the associated remote address and one or more indicators that identify the first portion in the memory.

17 Claims, 5 Drawing Sheets

DRAM REMOTE ACCESS CACHE IN LOCAL MEMORY IN A DISTRIBUTED SHARED MEMORY SYSTEM

BACKGROUND

1. Field of the Invention

This invention is related to the field of computer systems and, more particularly, to coherence mechanisms in computer systems.

2. Description of the Related Art

Historically, shared memory multiprocessing systems have implemented hardware coherence mechanisms. The hardware coherence mechanisms ensure that updates (stores) to memory locations by one processor (or one process, which may be executed on different processors at different points in time) are consistently observed by all other processors that read (load) the updated memory locations according to a specified ordering model. Implementing coherence may aid the correct and predictable operation of software in a multi-processing system. While hardware coherence mechanisms simplify the software that executes on the system, the hardware coherence mechanisms may be complex and expensive to implement (especially in terms of design time). Additionally, if errors in the hardware coherence implementation are found, repairing the errors may be costly (if repaired via hardware modification) or limited (if software workarounds are used).

One of the most difficult aspects of many hardware coherence mechanisms has to do with handling cache evictions of data (often referred to as writebacks). The data is in a state of transition, and may be in one of many locations between the source cache and its destination (another cache or the memory system). Numerous race conditions may exist between the coherence activity that is attempting to locate the most recent updates to the data and the progress of the writeback. The problem is particularly complex in distributed shared memory systems, where the writeback operation and data may need to be transferred to another node. The transfer may have a high latency, and may also introduce additional locations (e.g. buffers) at which the writeback may be found along the path.

Other systems have used a purely software approach to the issue of shared memory. Generally, the hardware in such systems makes no attempt to ensure that the data for a given memory access (particularly loads) is the most up to date. Software must ensure that non-updated copies of data are invalidated in various caches if coherent memory access is desired. While software mechanisms are more easily repaired if an error is found and are more flexible if changing the coherence scheme is desired, they typically have much lower performance than hardware mechanisms.

SUMMARY

In one embodiment, a memory controller for a node in a multi-node computer system is contemplated. The memory controller comprises logic and a control unit coupled to the logic. The logic is configured to determine if an address corresponding to a request received by the memory controller on an intranode interconnect is a remote address mapped to remote memory in another node of the multi-node computer system or a local address mapped to a memory in the node that includes the memory controller. A first portion of the memory in the node is allocated to store copies of remote data and a remaining portion stores local data. The control unit is configured to write writeback data to a location in the first portion. The writeback data corresponds to a writeback request from the intranode interconnect that has an associated remote address detected by the logic. The control unit is configured to determine the location responsive to the associated remote address and one or more indicators that identify the first portion in the memory. The writeback request is generated by a cache in the node in response to evicting the writeback data from the cache.

In an embodiment, a node comprises an intranode interconnect, a cache coupled to the intranode interconnect, an interface circuit, and a memory controller coupled to the intranode interconnect. The cache is configured to evict a remote cache line of data and to generate a writeback request on the intranode interconnect, wherein the writeback request comprises the remote cache line and a remote address identifying the remote cache line. The interface circuit is configured to couple the node to at least one other node via an internode interconnect, wherein the remote address is mapped to a remote memory in the at least one other node. Configured to couple to a memory, the memory controller is configured, responsive to the writeback request and the remote address, to write the remote cache line to a first portion of the memory in the node that is allocated to store copies of remote data. A remaining portion of the memory stores local data, and a location in the first portion to which the remote cache line is written is determined responsive to the remote address and one or more indicators that identify the first portion in the memory.

A method comprises evicting a cache line from a cache in a node; determining that the cache line is remote to the node; and writing the cache line to a first portion of a memory in the node responsive to the determining, wherein the first portion of the memory is allocated to store copies of remote cache lines, wherein the writing comprises determining a location within the first portion responsive to an address of the cache line and one or more indicators identifying the first portion in the memory.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
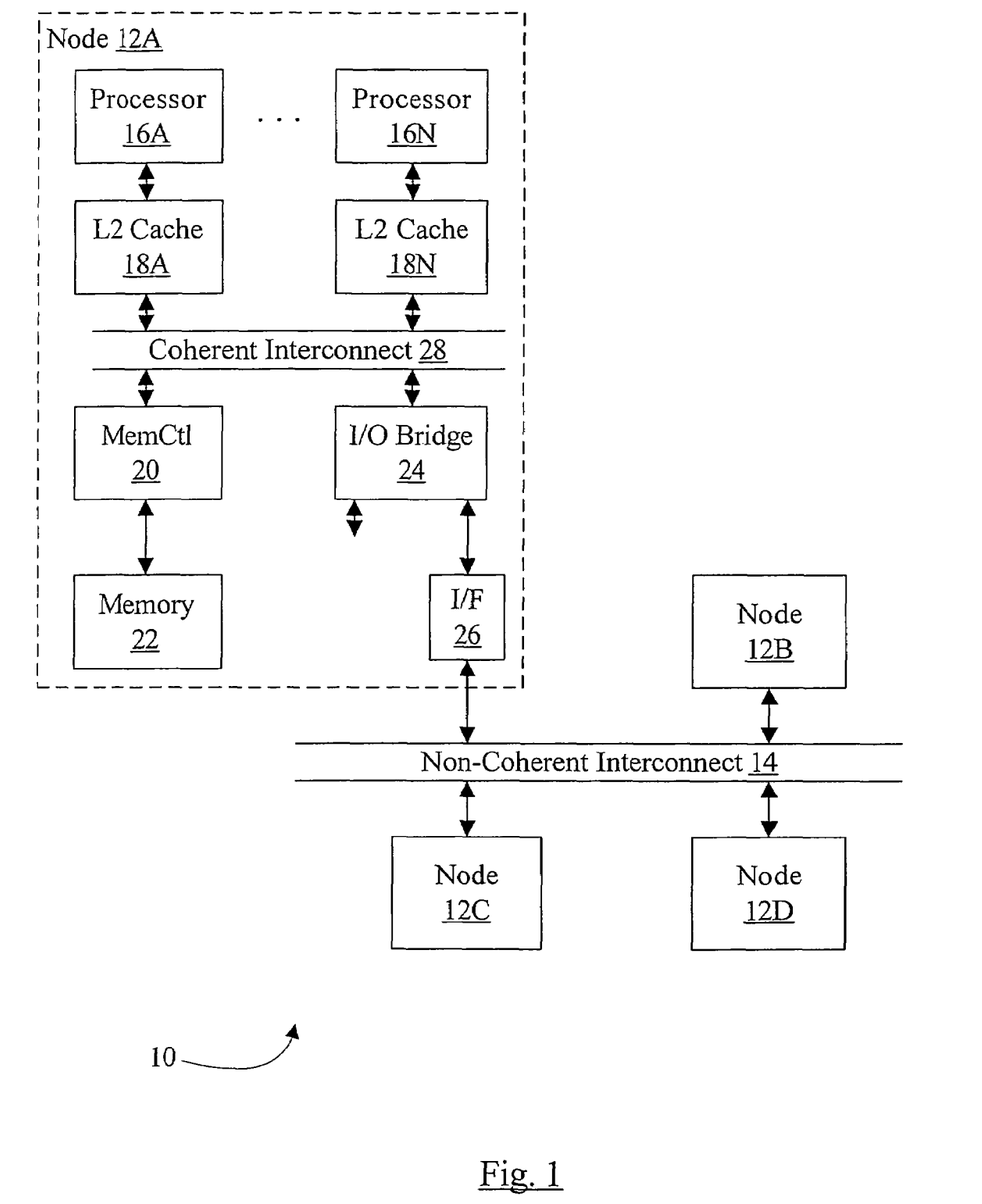
FIG. 1 is a block diagram of one embodiment of a system.

Turning now to FIG. 1, a block diagram of one embodiment of a system 10 is shown. In the illustrated embodiment, the system 10 comprises a plurality of nodes 12A-12D coupled to a non-coherent interconnect 14. The node 12A is shown in greater detail for one embodiment, and other nodes 12B-12D may be similar. In the illustrated embodiment, the node 12A includes one or more processors 16A-16N, corresponding L2 caches 18A-18N, a memory controller 20 coupled to a memory 22, and an input/output (I/O) bridge 24 coupled to one or more I/O interfaces including an interface 26 to the interconnect 14. In the illustrated embodiment, the L2 caches 18A-18N are coupled to respective processors 16A-16N and to a coherent interconnect 28. In other embodiments, a given L2 cache may be shared by two or more processors 16A-16N, or a single L2 cache may be shared by all processors 16A-16N. In still other embodiments, the L2 caches 18A-18N may be eliminated and the processors 16A-16N may couple directly to the interconnect 28. The memory controller 20 is coupled to the interconnect 28, and to the memory 22. The interconnect 28, since it is used to communicate among the components within a node, is an intranode interconnect. The interconnect 14 is used to communicate among nodes, and thus is an internode interconnect.

The memory 22 in the node 12A and similar memories in other nodes 12B-12D may form a distributed shared memory for the system 10. In the illustrated embodiment, each node 12A-12D implements hardware-based coherence internally. The distributed shared memory may also be coherent. The coherence of the distributed shared memory may be maintained primarily in software, with certain hardware support. For example, the processors 16A-16N may support a coherence trap for memory operations that require internode coherence activity to maintain coherency in the distributed shared memory. Coherence code may be executed in response to the trap, to ensure that internode coherence is maintained.

Data from the memory in other nodes 12B-12D may be cached within the node 12A (e.g. in the L2 caches 18A-18N, L1 caches within the processors 16A-16N, etc.) and may be modified within the cache. Accordingly, when the data is evicted from the cache, a writeback operation may occur. The memory controller 20 may be configured to use a portion of the memory 22 (referred to as a DRAM remote access cache, herein) to store writeback data corresponding to other nodes. That is, the DRAM remote access cache may store copies of remote data. The DRAM remote access cache may be primarily managed by software (except for writeback updates), whereas the L2 caches 18A-18N and L1 caches in the processors 16A-16N may be primarily hardware managed. That is, software may allocate an entry in the DRAM remote access cache for a remote cache line that is coherently transferred into the node. Allocating the entry may also include writing back the data that is evicted from that entry, if applicable. Thus, the complexities of transferring data among the nodes may be handled in software. The hardware handling of the cache eviction and writeback operation may simplify handling of the evictions, since the eviction of a given cache line is generally asynchronous to instructions that access that given cache line.

The coherence code may subsequently write remote data from the memory 22 back to the node to which the remote data belongs. Data belonging to another node 12B-12D is referred to as "remote data", a "remote cache line", etc. The address of such data is referred to as the "remote address". Addresses within memory 22 are referred to as local addresses, and the corresponding data is referred to as local data, except for the portion allocated to the DRAM remote access cache. Thus, the memory 22 may store both remote data (in the DRAM remote access cache) and local data. Note that "remote" and "local" are relative to a given node. A given node is the "home node" for the local data in its memory 22.

Any desired mechanisms may be implemented to detect coherence traps (e.g. signals transmitted with data or other communications to indicate whether or not a coherence trap is to occur, virtual-page based mechanisms, etc.). In one implementation, the hardware support may comprise detecting a designated value in the data accessed by a memory operation executed by a processor 16A-16N, and trapping to the coherence code in response to the detection. The designated value may be used by the software coherence mechanism to indicate that the data is invalid in the node.

As used herein, a memory operation may comprise any read or write of a memory location performed by a processor as part of executing an instruction. A load memory operation (or more briefly, a load) is a read operation that reads data from a memory location. A store memory operation (or more briefly, a store) is a write operation that updates a memory location with new data. The memory operation may be explicit (e.g. a load or store instruction), or may be an implicit part of an instruction that has a memory operand, based on the instruction set architecture (ISA) implemented by the processors 16A-16N.

Generally, a "trap" may refer to a transfer in control flow from an instruction sequence being executed to a designated instruction sequence that is designed to handle a condition detected by the processor 16A-16N. In some cases, trap conditions may be defined in the ISA implemented by the processor. In other cases, or in addition to the ISA-defined conditions, an implementation of the ISA may define trap conditions. Traps may also be referred to as exceptions.

In one embodiment, the processors 16A-16N may implement the SPARC instruction set architecture, and may use the exception trap vector mechanism defined in the SPARC ISA. One of the reserved entries in the trap vector may be used for the coherence trap, and the alternate global registers may be used in the coherence routines to avoid register spill. Other embodiments may implement any ISA and corresponding trap/exception mechanism.

Providing some hardware for coherence in the distributed shared memory may simplify software management of the coherence, in some embodiments. Additionally, in some embodiments, performance may be improved as compared to a software-only coherence implementation.

Each processor 16A-16N may comprise circuitry for executing instructions defined in the instruction set architecture implemented by the processor. Any instruction set architecture may be used. Additionally, any processor microarchitecture may be used, including multithreaded or single threaded, superscalar or scalar, pipelined, superpipelined, in order or out of order, speculative or non-speculative, etc. In one embodiment, each processor 16A-16N may implement one or more level 1 (L1) caches for instructions and data, and thus the caches 18A-18N are level 2 (L2) caches. The processors 16A-16N may be discrete microprocessors, or may be integrated into multi-core chips. The processors 16A-16N may also be integrated with various other components, including the L2 caches 18A-18N, the memory controller 20, the I/O bridge 24, and/or the interface 26.

The L2 caches 18A-18N comprise high speed cache memory for storing instructions/data for low latency access by the processors 16A-16N. The L2 caches 18A-18N are configured to store a plurality of cache lines, which may be the unit of allocation and deallocation of storage space in the cache. The cache line may comprise a contiguous set of bytes from the memory, and may be any size (e.g. 64 bytes, in one embodiment, or larger or smaller such as 32 bytes, 128 bytes, etc.). The L2 caches 18A-18N may have any configuration (direct-mapped, set associative, etc.) and any capacity. Cache lines may also be referred to as cache blocks, in some cases.

The memory controller 20 is configured to interface to the memory 22 and to perform memory reads and writes responsive to the traffic on the interconnect 28. The memory 22 may comprise any semiconductor memory. For example, the memory 22 may comprise random access memory (RAM), such as static RAM (SRAM) or dynamic RAM (DRAM). Particularly, the memory 22 may comprise asynchronous or synchronous DRAM (SDRAM) such as double data rate (DDR or DDR2) SDRAM, RAMBUS DRAM (RDRAM), etc.

The I/O bridge 24 may comprise circuitry to bridge between the interconnect 28 and one or more I/O interconnects. Various industry standard and/or proprietary interconnects may be supported, e.g. peripheral component interconnect (PCI) and various derivatives thereof such as PCI Express, universal serial bus (USB), small computer systems interface (SCSI), integrated drive electronics (IDE) interface, Institute for Electrical and Electronic Engineers (IEEE) 1394 interfaces, Infiniband interfaces, HyperTransport links, network interfaces such as Ethernet, Token Ring, etc. In other embodiments, one or more interface circuits such as the interface 26 may directly couple to the interconnect 28 (i.e. bypassing the I/O bridge 24).

The coherent interconnect 28 comprises any communication medium and corresponding protocol that supports hardware coherence maintenance. The interconnect 28 may comprise, e.g., a snoopy bus interface, a point to point packet interface with probe packets included in the protocol (or other packets used for coherence maintenance), a ring interface, etc. The non-coherent interconnect 14 may not include support for hardware coherency maintenance. For example, in one embodiment, the interconnect 14 may comprise Infiniband. Other embodiments may use any other interconnect (e.g. HyperTransport non-coherent, various I/O or network interfaces mentioned above, etc.). In other embodiments, the interconnect 14 may include support for hardware coherence maintenance, but such support may not be used to maintain coherence over the distributed shared memory system.

The system 10 as a whole may have any configuration. For example, the nodes 12A-12D may be "blades" in a blade server system, stand-alone computers coupled to a network, boards in a server computer system, etc.

It is noted that, while 4 nodes are shown in the system 10 in FIG. 1, other embodiments may include any number of 2 or more nodes, as desired. The number of processors 16A-16N in a given node may vary, and need not be the same number as other nodes in the system.

Figure 2:
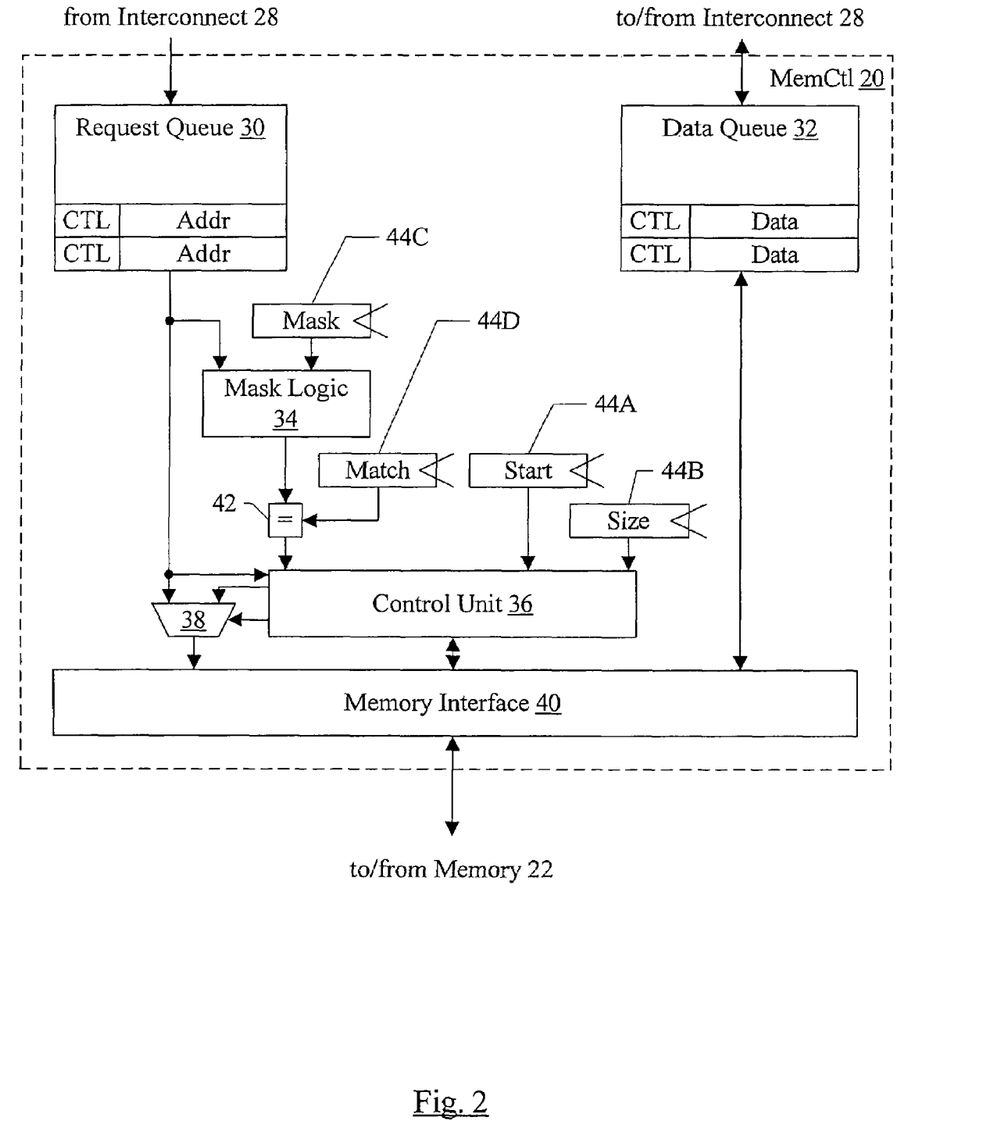
FIG. 2 is a block diagram of one embodiment of a memory controller.

Turning now to FIG. 2, a block diagram of one embodiment of a portion of the memory controller 20 is shown. In the illustrated embodiment, the memory controller 20 may include a request queue 30 coupled to receive requests from the interconnect 28, a data queue 32 coupled to receive data from the interconnect 28 (for write requests) and to provide data to the interconnect 28 (for read requests). The request queue is also coupled to mask logic 34, a control unit 36, and a multiplexor (mux) 38. The mux is coupled to the control unit 36 and to a memory interface circuit 40 that is coupled to the memory 22. The control unit 36 is coupled to the memory interface circuit 40, a comparator 42, and start and size registers 44A-44B. The comparator 42 is further coupled to the mask logic 34 and a match register 44D. The mask logic 34 is further coupled to a mask register 44C. The data queue 32 is coupled to the memory interface circuit 40.

Memory requests may be received from the interconnect 28 into the request queue 30. The memory request queue 30 may comprise a plurality of entries, each of which may store the address of a request and various control (CTL) information (e.g. the type of request: read, write, or writeback; the size of the request; the data queue entry assigned to the data; etc.). The data queue 32 may store the data for a request, either received from the interconnect 28 to be written to the memory 22 or received from the memory 22 to be supplied on the interconnect 28. Additional control (CTL) information may be provided in the data queue 32 as well (e.g. valid indications for the data, etc.).

The control unit 36 may select a memory request from the request queue 30 to be transmitted to the memory 22, and may read the request from the request queue 30. If the address of the request is a remote address and the request is a writeback, the control unit 36 may write the request to the DRAM remote access cache memory area in the memory 22. Otherwise, if the address is a local address, the control unit 36 may perform the access as a normal read or write to the memory 22. The mux 38 may be used to select between the request address and an address generated by the control unit 36. The request address may be used if it is a local address, and the address from the control unit 36 may be used if the request address is a remote address of a writeback.

In the illustrated embodiment, the memory controller 20 is programmable, via the registers 44A-44D, to allocate a portion of the memory 22 to the DRAM remote access cache and to detect remote addresses. The registers 44A-44B may be used to identify the DRAM remote access cache memory area. In the illustrated embodiment, the register 44A stores a start address of the DRAM remote access cache memory area, and the register 44B stores the size (e.g. in terms of bytes, number of cache lines, etc.). Other embodiments may define the memory area in any desired fashion (e.g. start and end address). The registers 44C-44D may be programmed to distinguish remote addresses from local addresses. The registers 44C-44D may be used to define which portion of the request address identifies the home node to which a given address is mapped (i.e. the node that has the memory locations assigned to that address within the system 10's address space). The address bits that define the home node need not be contiguous, although they may be if desired. Specifically, the mask register 44C is programmable to mask bits of the address that are not used to indicate the home node. The mask logic 34 is coupled to receive the mask from the mask register 44C and the address of a request from the request queue 30. The mask logic 34 applies the mask (e.g. bitwise ANDing the mask with the address). The match register 44D is programmable with a match value that identifies the node 12A as the home node. That is, a match with the match register 44D indicates a local address, and a mismatch indicates a remote address. Accordingly, the comparator 42 compares the masked address from the mask logic 34 to the match register 44D and supplies the comparison result to the control unit 36.

The control unit 36 may form the address for a writeback to the DRAM remote access cache using the start and size values. Particularly, the size may determine the number of address bits used to index into the DRAM remote access cache. The control unit 36 may select the bits, and add the index to the start address to identify the entry. The bits may be selected from any portion of the address. For example, the least significant bits of the address (exclusive of the offset within a cache line) may be used.

The memory interface circuit 40 may be configured to generate the memory interface signals for a given request to interface to the memory 22. For example, DRAM memory interfaces may include row and column addresses derived from the request address, etc.

It is noted that the mask and match by the mask logic 34 and the comparator 42 may alternatively be performed as the operation is written to the request queue 30, and the result of the comparison may be included in the control information in the request queue 30.

It is noted that, while a request queue 30 and a data queue 32 are shown in FIG. 2, any set of queues or other buffers may be used to store requests and data, as desired. Additionally, while the registers 44A-44D are shown in FIG. 2, two or more of the illustrated registers 44A-44D may be combined into a single physical register, or may be logically addressed as fields within a single logical register even if separate physical registers are used.

Figure 3:
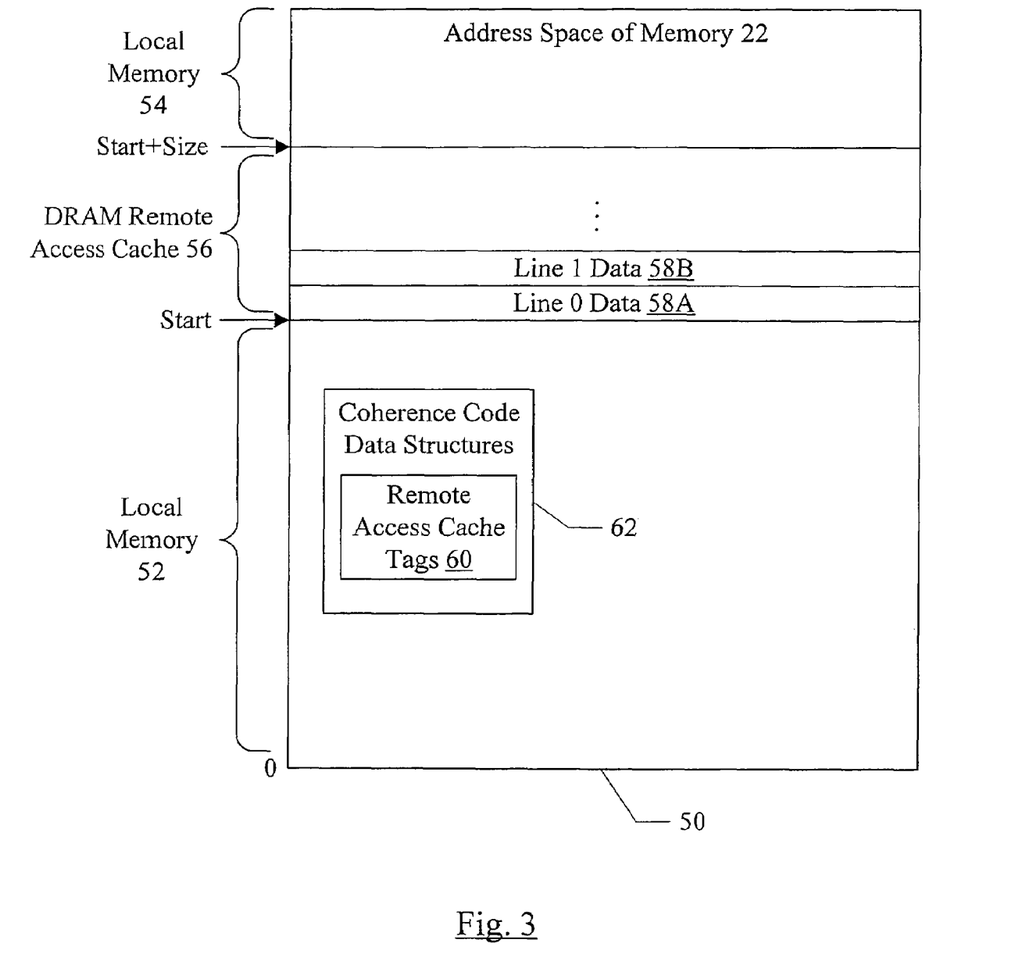
FIG. 3 is a block diagram of one embodiment of a memory address space.

Turning now to FIG. 3, a block diagram of one embodiment of an address space 50 corresponding to the memory 22 is shown. In the illustrated embodiment, address 0 is at the bottom of the figure and increasing numerical addresses are shown from bottom to top. The start and size values divide the address space (and thus the corresponding memory locations) into two portions: local memory, below the start address and above the sum of the start address and the size (reference numerals 52 and 54); and the DRAM remote access cache 56 between the start address and the sum of the start address and size. The DRAM remote access cache 56 may also be placed at the bottom of the address range (e.g. by programming the start address to 0) or the top of the address range (by programming the registers 44A-44B so that the sum of the start address and size is the maximum address within the memory 22). In such cases, there would be one contiguous area of local memory.

The DRAM remote access cache 56 is illustrated in FIG. 3 as a set of cache lines (e.g. cache line 0 58A, cache line 1 58B, etc.). In the present embodiment, the DRAM remote access cache 56 may be tagless from a hardware standpoint. That is, no tag lookup is performed in the DRAM remote access cache. If a remote writeback occurs, the memory controller 20 updates the indexed entry of the DRAM remote access cache. Software, particularly the coherence code, may be responsible for ensuring that only one remote cache line that indexes to a given entry in the DRAM remote access cache 56 is stored in the node 12A at any given point in time. In this embodiment, the coherence code records the DRAM remote access cache tags 60 in its data structures 62, which are stored in the local memory. Various other data may be maintained by the coherency code in the data structures 62, in various embodiments.

In the case of a remote address for a read request, the memory controller 20 may, in some cases, be able to determine that a hit in the DRAM remote access cache 56 has occurred even though it is tagless. For example, in some embodiments, the memory controller 20 may maintain a reverse directory of addresses of cache lines cached in various hardware-managed caches within the node. If there is a hit in the reverse directory for a remote address, the memory controller 20 may determine that the remote address is also a hit in the DRAM remote access cache 56 at the location indexed by the remote address. If the memory controller 20 cannot determine a hit in the DRAM remote access cache 56, the memory controller 20 may be configured to cause a trap to the coherence code.

In other embodiments, the DRAM remote access cache 56 may store both cache lines of data and tags. In such embodiments, the memory controller 20 may verify a hit in the cache 56 before writing the writeback data to the DRAM remote access cache 56 or before reading data from the DRAM remote access cache 56. In the illustrated embodiment, the DRAM remote access cache 56 is a direct mapped cache (i.e. a given remote address indexes a single entry in the cache). Other embodiments may be set associative, in which a given address indexes two or more entries in the cache. In such an embodiment, at least a partial tag or other identifier may be used to select one of the indexed entries for a given remote address.

Figure 4:
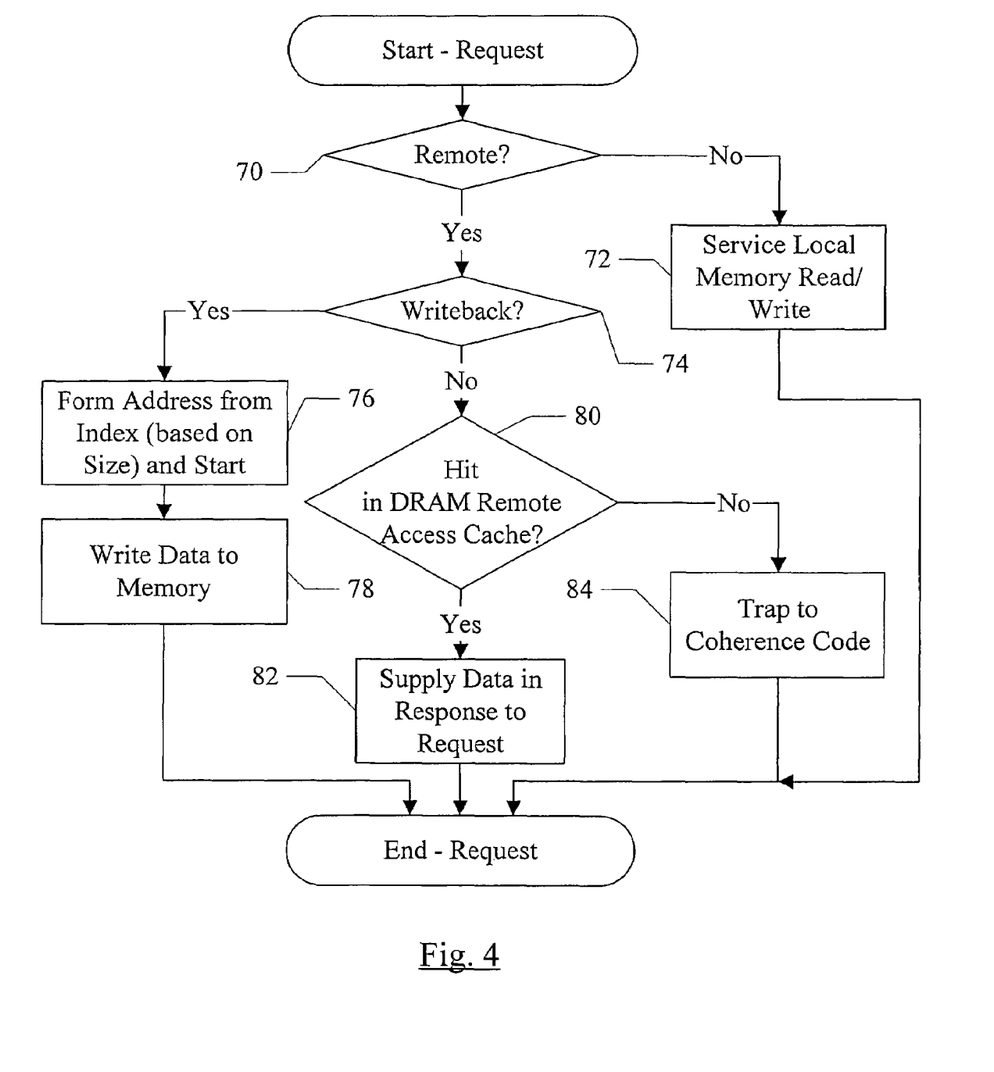
FIG. 4 is a flowchart illustrating operation of one embodiment of a control unit shown in FIG. 2.

Turning now to FIG. 4, a flowchart is shown illustrating operation of one embodiment of the memory controller 20 (and more particularly the control unit 36, for the embodiment of FIG. 2) in response to a request. While the blocks are shown in a particular order for ease of understanding, other orders may be used. Blocks may be performed in parallel in combinatorial logic within the memory controller 20. Blocks, combinations of blocks, and/or the flowchart as a whole may be pipelined over multiple clock cycles.

The memory controller 20 may determine if the address of the request is remote or local (decision block 70). If the address is local (decision block 70, "no" leg), the memory controller 20 may service the local memory read/write (block 72). Local memory read/write requests may include requests that map to the memory allocated to the DRAM remote access cache 56. For example, the coherence code may use such addresses to read/write the contents of the DRAM remote access cache 56. Thus, the coherence code may evict a remote cache line from the DRAM remote access cache 56, using the local address that maps to the entry to read the data for transmission back to the home node. The coherence code may use the local address of the entry to load the fetched cache line into the entry as well. Other software (e.g. the operating system of the system 10) may be programmed to view the DRAM remote access cache 56 address range as non-existent memory, so that the memory is not used (e.g. not allocated by the operating system for use by various programs).

If the address is remote (decision block 70, "yes" leg), the memory controller 20 may determine if the operation is a writeback (decision block 74). For example, the control information in the request queue 30 may indicate the type of operation. If the operation is a writeback (decision block 74, "yes" leg), the memory controller 20 may form the address of the writeback cache entry (based on the remote address, the size field, and the start address—block 76). For example, if the size register indicates that there are 1024 cache lines in the DRAM remote access cache in a direct-mapped embodiment, 10 address bits from the remote address may be used to form the index, left shifted by the size of a cache line. The left-shifted index may be added to the start address to form the address of the write back cache entry. The memory controller 20 may write the data to the memory using the address (block 78).

If the operation is not a writeback (decision block 74, "no" leg), the memory controller 20 may optionally determine if the operation is a hit in the DRAM remote access cache 56 (decision block 80). For example, embodiments that implement a reverse directory or a tag in the DRAM remote access cache 56 may be able to determine a hit, at least in some cases. If the operation is a hit (decision block 80, "yes" leg), the memory controller 20 may read the hit entry and supply the data in response to the request (block 82). If the operation is not a hit, at least as can be determined by the memory controller hardware (decision block 80, "no" leg), the memory controller 20 may signal a trap to the coherence code to obtain the remote data (block 84). As mentioned previously, the trap may be signalled in many ways (e.g. returning a designated value, special signalling, etc.).

Figure 5:
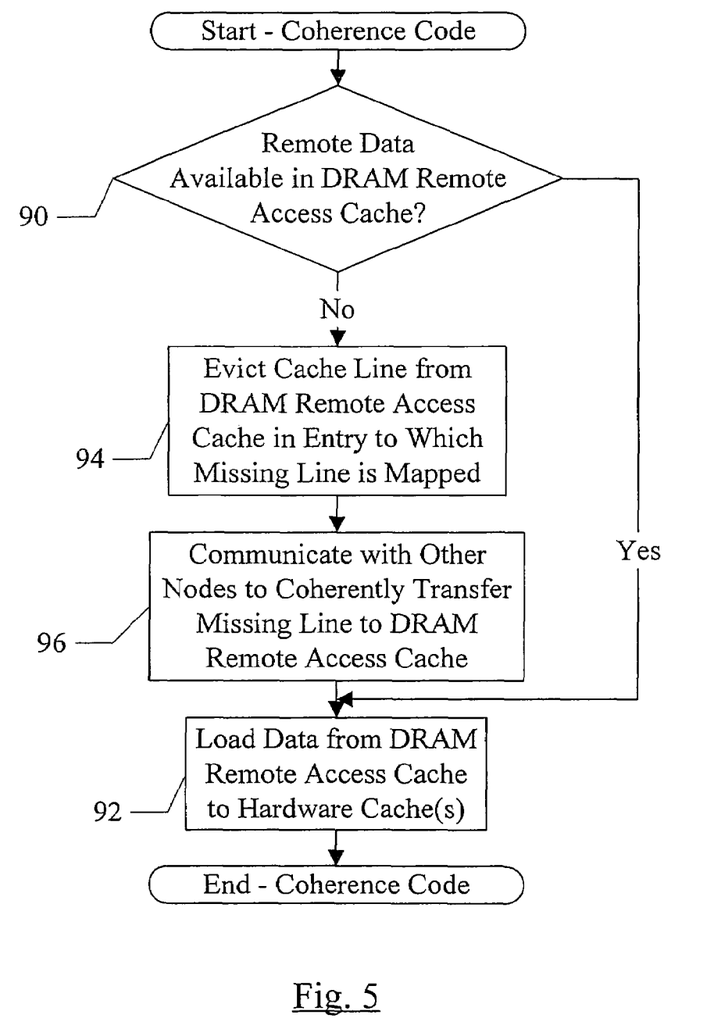
FIG. 5 is a flowchart illustrating operation of one embodiment of coherence code.

Turning now to FIG. 5, a flowchart is shown illustrating operation of one embodiment of the coherence code in response to a coherence trap by the memory controller 20 (for a DRAM remote access cache miss). While the blocks are shown in a particular order for ease of understanding, any order may be used. The coherence code may comprise instructions which, when executed in the system 10, implement the operation shown in FIG. 5.

The coherence code may determine if the remote data is available in the DRAM remote access cache 56 using the tags 60 (decision block 90). For example, in embodiments in which there is no hit detection in the memory controller 20 (or limited hit detection, such as the reverse directory), there may be cases where the remote data is a hit in the DRAM remote access cache 56 but the memory controller 20 cannot detect the hit. If the remote data is available (with appropriate permission for the memory operation—decision block 90, "yes" leg), the coherence code may load the data from the DRAM remote access cache 56 into the hardware cache(s) (e.g. by executing one or more cacheable load memory operations, using dedicated cache control instructions, etc.—block 92).

If the remote data is not available in the DRAM remote access cache 56 (decision block 90, "no" leg), the coherence code may evict the remote cache line from the DRAM remote access cache in the entry indexed by the missing remote address (block 94). The eviction may ensure that only one remote cache line per DRAM remote access cache entry is stored in the node 12A. The coherence code may communicate with other nodes to coherently transfer the evicted cache line (if necessary) to the home node and to transfer the missing cache line to the DRAM remote access cache 56 (block 96). The coherence code may also load the data into the hardware caches (block 92).

Any software coherence protocol may be used. In one example, the coherence code in each node may maintain data structures in memory (e.g. data structures 62 in FIG. 3) that identify which cache lines are shared with other nodes, as well as the nodes with which they are shared, which cache lines are modified in another node, etc. The coherence code may lock an entry in the data structure corresponding to the missing cache line, perform the transfer (obtaining the most recent copy) and unlock the entry. Other embodiments may use numerous other software mechanisms, including interrupting and non-interrupting mechanisms. It is noted that software may maintain coherence at a coarser or finer grain than a cache line, in other embodiments. Furthermore, other embodiments may implement the coherence protocol in hardware.

Figure 6:
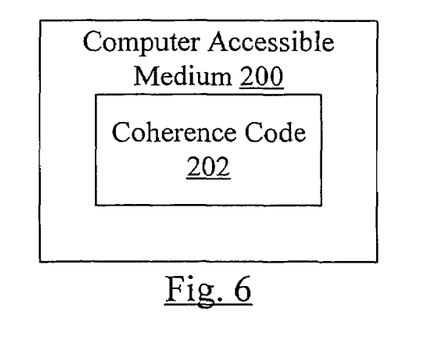
FIG. 6 is a block diagram of one embodiment of a computer accessible medium.

Turning now to FIG. 6, a block diagram of a computer accessible medium 200 is shown. Generally speaking, a computer accessible medium may include any media accessible by a computer during use to provide instructions and/or data to the computer. For example, a computer accessible medium may include storage media. Storage media may include magnetic or optical media, e.g., disk (fixed or removable), tape, CD-ROM, or DVD-ROM, CD-R, CD-RW, DVD-R, DVD-RW. Storage media may also include volatile or non-volatile memory media such as RAM (e.g. synchronous dynamic RAM (SDRAM), Rambus DRAM (RDRAM), static RAM (SRAM), etc.), ROM, or Flash memory. Storage media may include non-volatile memory (e.g. Flash memory) accessible via a peripheral interface such as the Universal Serial Bus (USB) interface in a solid state disk form factor, etc. The computer accessible medium may include microelectromechanical systems (MEMS), as well as media accessible via transmission media or signals such as electrical, electromagnetic, or digital signals, conveyed via a communication medium such as a network and/or a wireless link. The computer accessible medium 200 in FIG. 6 may store the coherence code 202 mentioned above. The coherence code may comprise instructions which, when executed, implement the operation described herein for the coherence code. Generally, the computer accessible medium 200 may store any set of instructions which, when executed, implement a portion or all of the flowchart shown in FIG. 5.

Numerous variations and modifications will become apparent to those skilled in the art once the above disclosure is fully appreciated. It is intended that the following claims be interpreted to embrace all such variations and modifications.

What is claimed is:

1. A memory controller for a node in a multi-node computer system, the memory controller comprising: logic configured to determine if an address corresponding to a request received by the memory controller on an intranode interconnect is a remote address mapped to remote memory in another node of the multi-node computer system or a local address mapped to a memory in the node that includes the memory controller, wherein a first portion of the memory in the node is allocated to store copies of remote data and a remaining portion stores local data;

a control unit coupled to the logic, wherein the control unit is configured to write writeback data to a location in the first portion, wherein the writeback data corresponds to a writeback request from the intranode interconnect that has an associated remote address detected by the logic, wherein the control unit is configured to determine the location responsive to the associated remote address and one or more indicators that identify the first portion in the memory, and wherein the writeback request is generated by a cache in the node in response to evicting the writeback data from the cache; and a mask register for storing a mask, and wherein the logic is configured to use the mask to mask off one or more portions of an address that do not distinguish remote addresses from local addresses.

2. The memory controller as recited in claim 1 wherein the one or more indicators comprise a base address of the first portion and a size of the first portion.

3. The memory controller as recited in claim 2 wherein the base address and size are programmable in one or more registers coupled to the control unit.

4. The memory controller as recited in claim 3 further comprising one or more additional registers coupled to the logic, wherein the one or more additional registers are programmable to distinguish remote addresses from local addresses.

5. The memory controller as recited in claim 4 wherein the one or more additional registers further store a match value, wherein the logic is configured to compare the match value to the masked address.

6. The memory controller as recited in claim 1 wherein a mismatch between the match value and the masked address indicates a remote address.

7. The memory controller as recited in claim 1 wherein, if the logic detects a local address for a request, the control unit is configured to read or write the memory identified by the local address according to the type of request.

8. A node comprising:

an intranode interconnect;

a cache coupled to the intranode interconnect, wherein the cache is configured to evict a remote cache line of data and to generate a writeback request on the intranode interconnect, the writeback request comprising the remote cache line and a remote address identifying the remote cache line;

an interface circuit coupled to the intranode interconnect and configured to couple the node to at least one other node via an internode interconnect, the remote address mapped to a remote memory in the at least one other node;

a memory controller coupled to the intranode interconnect and configured to couple to a memory, wherein the memory controller is configured, responsive to the writeback request and the remote address, to write the remote cache line to a first portion of the memory in the node that is allocated to store copies of remote data, wherein a remaining portion of the memory stores local data, and wherein a location in the first portion, to which the remote cache line is written, is determined responsive to the remote address and one or more indicators that identify the first portion in the memory; and a mask register for storing a mask, and wherein the memory controller is configured to use the mask to mask off one or more portions of an address that do not distinguish remote addresses from local addresses.

9. The node as recited in claim 8 wherein the one or more indicators comprise a base address of the first portion and a size of the first portion.

10. The node as recited in claim 9 wherein the base address and size are programmable in one or more registers in the memory controller.

11. The node as recited in claim 10 further comprising one or more additional registers in the memory controller, wherein the one or more additional registers are programmable to distinguish remote addresses from local addresses.

12. The node as recited in claim 11 wherein the one or more additional registers further store a match value, wherein the memory controller is configured to compare the match value to the masked address.

13. The node as recited in claim 12 wherein a mismatch between the match value and the masked address indicates a remote address.

14. The node as recited in claim 8 wherein, if the memory controller detects a local address for a request, the memory controller is configured to read or write the memory identified by the local address according to the type of request.

15. A method comprising:

evicting a cache line from a cache in a node;

determining that the cache line is remote to the node; and writing the cache line to a first portion of a memory in the node responsive to the determining, wherein the first portion of the memory is allocated to store copies of remote cache lines, wherein the writing comprises determining a location within the first portion responsive to an address of the cache line and one or more indicators identifying the first portion in the memory; and masking off one or more portions of an address that do not distinguish remote addresses from local addresses; and comparing a match value to the masked address, wherein a mismatch between the match value and the masked address indicates a remote address.

16. The method as recited in claim 15 wherein the one or more indicators comprise a base address of the first portion and a size of the first portion.

17. The method as recited in claim 15 further comprising:

detecting a local address for a request; and reading or writing the memory identified by the local address according to the type of request.

* * * * *